US009055738B1

(12) United States Patent
Woller et al.

(10) Patent No.: US 9,055,738 B1
(45) Date of Patent: Jun. 16, 2015

(54) GAME LIFTING APPARATUS AND METHOD OF USE

(71) Applicant: Viking Solutions, LLC, Decatur, AL (US)

(72) Inventors: Ronald R. Woller, Decatur, AL (US); John A. Woller, Decatur, AL (US); John A. Woller, Jr., Decatur, AL (US)

(73) Assignee: VIKING SOLUTIONS, LLC, Decatur, AL (US)

( * ) Notice: Subject to any disclaimer, the term of this patent is extended or adjusted under 35 U.S.C. 154(b) by 0 days.

(21) Appl. No.: 14/560,885

(22) Filed: Dec. 4, 2014

Related U.S. Application Data

(60) Provisional application No. 61/913,022, filed on Dec. 6, 2013.

(51) Int. Cl.
| B66D 1/00 | (2006.01) |
| A01M 31/00 | (2006.01) |
| B65G 67/04 | (2006.01) |
| B66C 23/18 | (2006.01) |

(52) U.S. Cl.
CPC .............. *A01M 31/00* (2013.01); *B65G 67/04* (2013.01); *B66C 23/18* (2013.01)

(58) Field of Classification Search
CPC ...... B66D 1/60; B66D 3/02; B66D 2700/021; A01M 31/00; A01M 31/006; B65G 67/04
USPC ................................................. 254/323, 332
See application file for complete search history.

(56) References Cited

U.S. PATENT DOCUMENTS

| 795,147 | A | * | 7/1905 | Magoffin | 414/639 |
| 1,789,025 | A | * | 1/1931 | Shepard, Jr. et al. | 187/230 |
| 2,894,605 | A | * | 7/1959 | Leavitt | 187/224 |
| 3,385,401 | A | * | 5/1968 | Campbell et al. | 187/222 |
| 3,671,015 | A | * | 6/1972 | Sullivan | 254/332 |
| 4,183,423 | A | * | 1/1980 | Lewis | 182/103 |
| 4,421,209 | A | * | 12/1983 | Vermette et al. | 187/235 |
| 4,881,864 | A | * | 11/1989 | Amato | 414/543 |
| 4,921,385 | A | * | 5/1990 | Okuno | 414/21 |
| 5,251,922 | A | * | 10/1993 | Mann | 280/47.29 |
| 5,294,136 | A | * | 3/1994 | Dick et al. | 280/5.2 |
| 5,772,183 | A | * | 6/1998 | Sears | 254/324 |
| 5,871,069 | A | * | 2/1999 | Carmitchel | 187/231 |
| 5,911,556 | A | | 6/1999 | Caldwell | |
| 5,975,826 | A | * | 11/1999 | Scholder | 414/444 |
| 6,189,866 | B1 | * | 2/2001 | Harkins et al. | 254/332 |
| 6,309,168 | B1 | * | 10/2001 | Holmes | 414/490 |

(Continued)

FOREIGN PATENT DOCUMENTS

CA 2515878 A1 9/2006

*Primary Examiner* — Emmanuel M Marcelo
(74) *Attorney, Agent, or Firm* — Bush Intellectual Property Law; Kenneth M. Bush (57) ABSTRACT

A portable and collapsible game animal lifting apparatus comprising a horizontal base member, a vertical support member pivotably attached to the base member, a horizontal lift member pivotably and slidably attached to the support member, and a winch attached to the support member. The winch is operably connected to the lift member for raising and lowering the lift member. The winch is operable to unwind a winch cable from the winch and thereby lower the lift member to receive the game animal thereupon. The winch is further operable to wind the winch cable about the winch and thereby raise the lift member to a desired height to assist in transferring the game animal to a transport vehicle.

8 Claims, 5 Drawing Sheets

(56) References Cited

U.S. PATENT DOCUMENTS

| | | | |
|---|---|---|---|
| 6,371,449 B1 * | 4/2002 | Chamberlain | 254/387 |
| 6,601,825 B2 * | 8/2003 | Bressner et al. | 254/4 R |
| 6,609,481 B1 | 8/2003 | McCarty | |
| 6,638,001 B1 | 10/2003 | McKinley | |
| 6,769,858 B1 | 8/2004 | Butler et al. | |
| 6,869,265 B2 | 3/2005 | Smith et al. | |
| 6,921,095 B2 * | 7/2005 | Middleby | 280/47.29 |
| 7,293,951 B2 | 11/2007 | Meeks | |
| 7,845,622 B1 * | 12/2010 | Riggs | 254/326 |
| 8,201,809 B2 * | 6/2012 | Bolton | 254/325 |
| 8,684,335 B2 * | 4/2014 | Hayes | 254/323 |
| 8,840,161 B1 | 9/2014 | Gardner | |
| 8,910,922 B1 * | 12/2014 | Erickson | 254/281 |
| 2004/0256607 A1 * | 12/2004 | Spitsbergen | 254/334 |
| 2005/0224440 A1 * | 10/2005 | Labrecque et al. | 212/301 |
| 2006/0104767 A1 | 5/2006 | Dugger et al. | |
| 2006/0182571 A1 | 8/2006 | Hightower | |
| 2007/0290181 A1 * | 12/2007 | Bell | 254/323 |
| 2008/0159831 A1 * | 7/2008 | Davis | 414/140.3 |
| 2008/0206031 A1 * | 8/2008 | Butta | 414/462 |
| 2010/0202868 A1 * | 8/2010 | Troy et al. | 414/809 |
| 2012/0319064 A1 * | 12/2012 | Selkowitz | 254/323 |

* cited by examiner

GAME LIFTING APPARATUS AND METHOD OF USE

CROSS-REFERENCE TO RELATED APPLICATION

This application claims priority to U.S. Provisional Patent Application No. 61/913,022 filed Dec. 6, 2013, the disclosure of which is incorporated herein by reference.

FIELD OF THE INVENTION

The present invention is directed to game lifting devices and, more particularly, to a portable and collapsible game lifting apparatus for assisting a hunter with lifting a game animal onto a transport vehicle.

BACKGROUND OF THE INVENTION

It is common practice in the sport of hunting large game animals to retrieve and transport harvested game using off-road vehicles, sport utility vehicles (SUV's), all-terrain vehicles (ATV's) and farm utility vehicles (UTV's). Many species of large game animals can easily weigh more than 200 pounds and it can be very difficult for a hunter to elevate an animal for loading into or onto a vehicle. In most instances this requires lifting the body of the animal 36 to 40 inches off the ground, and in many situations this is accomplished by a lone hunter.

What is needed is a portable game lifting apparatus that is compact and lightweight so that it can be conveniently transported and used by a single person.

SUMMARY OF THE INVENTION

The present invention is a portable and collapsible game animal lifting apparatus preferably comprising a substantially horizontal base member, a substantially vertical support member, a substantially horizontal lift member, and a winch attached to the support member, wherein the winch is operably connected to the lift member for raising and lowering the lift member. The base member preferably has a first elongated base tube having a first end with a slot formed therein, a second elongated base tube having a first end with a slot formed therein, and at least one connecting base tube orthogonally affixed to the first base tube and the second base tube to maintain the first base tube in a fixed, parallel, and spaced relationship relative to the second base tube. The support member preferably has a first elongated support tube having a top end and a bottom end, a second elongated support tube having a top end and a bottom end, and at least one connecting support tube orthogonally affixed to the first support tube and the second support tube to maintain the first support tube in a fixed, parallel, and spaced relationship relative to the second support tube. The bottom end of the first support tube is pivotably attached to the first base tube and the bottom end of the second support tube is pivotably attached to the second base tube, wherein the support tube is preferably pivotable 90 degrees relative to the base tube. The lift member preferably has a first lift tube having a first end, a second lift tube having a first end, and at least one connecting lift tube orthogonally affixed to the first lift tube and the second lift tube to maintain the first lift tube in a fixed, parallel, and spaced relationship relative to the second lift tube. The lift member is pivotably and slidably attached to the support member, wherein the lift tube is preferably pivotable 90 degrees relative to the support tube.

A first angled bracket is preferably fixedly attached to the first end of the first lift tube and pivotably and slidably attached to the first support tube. The first angled bracket preferably has a pair of spaced rollers for rotatably engaging opposing sides of the first support tube to facilitate the first lift tube with sliding along the length of the first support tube. A second angled bracket is preferably fixedly attached to the first end of the second lift tube and pivotably and slidably attached to the second support tube. The second angled bracket preferably has a pair of spaced rollers for rotatably engaging opposing sides of the second support tube to facilitate the second lift tube with sliding along the length of the second support tube. The winch is preferably a hand-operable, manually-driven winch attached to an upper connecting support tube orthogonally affixed at or near the top end of the first support tube and the top end of the second support tube. The winch has a winch cable preferably connected to a connecting lift tube for raising and lowering the lift member. A first support cable preferably has a first end secured to the upper connecting support tube and a second end having a cable locking mechanism formed thereon. A second support cable preferably has a first end secured to the upper connecting support tube and a second end having a cable locking mechanism formed thereon.

The cable locking mechanism of the first support cable is operable to reversibly engage the slot in the first end of the first base tube to secure the support member in an upright position for lifting the game animal. The cable locking mechanism of the second support cable is operable to reversibly engage the slot in the first end of the second base tube to secure the support member in an upright position for lifting the game animal. The winch is operable to unwind the winch cable from the winch and thereby lower the lift member to receive the game animal thereupon. The winch is further operable to wind the winch cable about the winch and thereby raise the lift member to a desired height to assist in transferring the game animal to a transport vehicle.

To collapse the lifting apparatus for transport or storage, the lift member is pivoted into abutment with the support member and the support member is pivoted into abutment with the base member. To set up the lifting apparatus for use, the support member is pivoted about 90 degrees away from the base member and the lift member is pivoted about 90 degrees away from the support member. The cable locking mechanism of the first support cable is inserted into the slot in the first end of the first base tube and the cable locking mechanism of the second support cable is inserted into the slot in the first end of the second base tube, thereby securing the support member in an upright position relative to the base member for lifting the game animal.

These and other features of the invention will become apparent from the following detailed description of the invention.

When the terms "top," "bottom," "right," "left," "front," "rear," "first," "second," "inside," "outside," "vertical," "horizontal," and similar terms are used herein, the terms should be understood in reference to the orientation of the implementations shown in the drawings and are utilized to facilitate description thereof.

DETAILED DESCRIPTION OF THE INVENTION

The present invention comprises a game lifting apparatus and a method of using the apparatus to lift a game animal. The game lifting apparatus comprises an assembly of fabricated frames designed to be quickly and easily configured into a rigid support arrangement for lifting (see FIGS. 1-7) or collapsed for storage and/or transportation (see FIGS. 8-10). As best shown in FIGS. 1-7, the preferred embodiment of the lifting apparatus comprises three fabricated frame sections made from hollow metal square tubing: a substantially horizontal base frame A for engaging the ground, a substantially vertical support frame B, and a substantially horizontal lifting frame C for supporting a game animal thereon.

The base frame A preferably comprises a first base tube 1, a substantially parallel second base tube 21, a rear base tube 11 orthogonally affixed to the rear ends of the first and second base tubes 1, 21, and a front base tube 31 orthogonally affixed to the front ends of the first and second base tubes 1, 21. Locking slots 16, 17 are preferably formed along the top surfaces of the first and second base tubes 1, 21 at the rear ends thereof.

The support frame B preferably comprises a right side tube 2, a substantially parallel left side tube 22, and a top tube 15 orthogonally affixed to the top ends of the right side and left side tubes 2, 22. A hand winch 7 operable to wind and unwind a winch cable 12 is preferably affixed to the top tube 15. Support cables 4, 44 are preferably connected at their respective top ends 41, 42 to the top tube 15. The bottom ends of the support cables 4, 44 have a cable locking mechanism, such as cable stop sleeves 13, 53, attached thereto. A pair of angled brackets 10, 20 and 30, 40 are preferably affixed to the bottom ends of the right side and left side tubes 2, 22, and are pivotably connected to the first and second base tubes 1, 21 by clevis pins 9. The base frame A and support frame B are preferably limited between a 0 to 90 degree pivot angle relative to each other due to the angled brackets 10, 20 and 30, 40.

The lifting frame C preferably comprises a first lift tube 3, a substantially parallel second lift tube 23, a rear lift tube 24 orthogonally affixed to the rear ends of the first and second lift tubes 3, 23, and a front lift tube 14 orthogonally affixed to the front ends of the first and second lift tubes 3, 23. A cable ring 8 is preferably affixed to the rear lift tube 24. The winch cable 12 is attached to the cable ring 8. Angled brackets 6 are preferably affixed to the rear ends of the first and second lift tubes 3, 23, and are secured about the right side and left side tubes 2, 22 for both pivotable movement and vertical movement. The lifting frame C and support frame B are preferably limited between a 0 to 90 degree pivot angle relative to each other due to the angled brackets 6. Each angled bracket 6 preferably has a pair of rollers 5 secured therein with clevis pins (19, 29, 39, 49). The rollers 5 in each bracket 6 are spaced apart both horizontally and vertically from each other. The right side and left side tubes 2, 22 are received within the spaces between the paired rollers 5 and the front and rear surfaces of the right side and left side tubes 2, 22 are engaged by the paired rollers 5. Thus, a cantilevered arrangement of the lifting frame C is realized from the vertical and horizontal separation of the support rollers 5. This cantilever/roller arrangement facilitates the primary function of the apparatus in the lifting or lowering of the lifting frame C with the game animal thereon.

In operation, the lifting apparatus is configured for use (see FIGS. 1-7). The cable stop sleeves 13, 53 of the support cables 4, 44 are inserted into the locking slots 16, 17 in the first and second base tubes 1, 21, thereby locking the lifting apparatus in a lifting configuration. The hand winch 7 is rotated to unwind the winch cable 12 therefrom. As the winch cable 12 is unwound, the lifting frame C is lowered by gravity until it comes to rest above the base frame A. As the lifting frame C is being lowered, the rollers 5 rotate along the front and rear surfaces of the right side and left side tubes 2, 22. The game animal can then be placed onto the lifting frame C and secured thereto if desired. The hand winch 7 is rotated to wind the winch cable 12 thereabout, thereby lifting the lifting frame C towards the top of the lifting apparatus. As the lifting frame C is being raised, the rollers 5 rotate along the front and rear surfaces of the right side and left side tubes 2, 22. The weight of the animal on the lifting apparatus keeps the support cables 4, 44 taut and thereby prevents the cable stop sleeves 13, 53 from dislodging from the locking slots 16, 17. When the lifting frame C is raised to a desired height, a transport vehicle can be positioned adjacent the lifting apparatus and the animal can be slid off the lifting frame C onto the transport vehicle.

Figure 1:
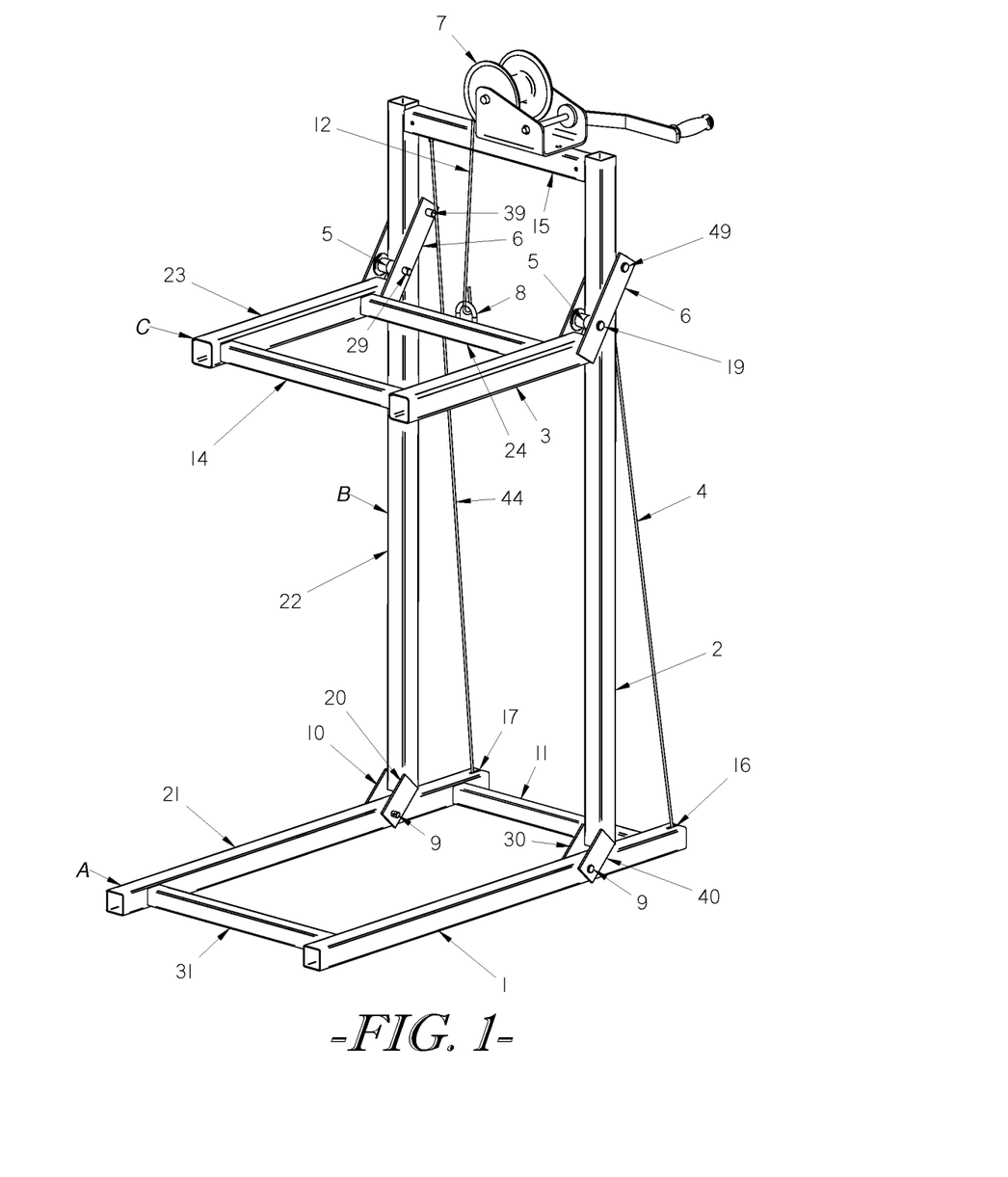
FIG. 1 is a right front perspective view of the lifting apparatus configured for use.
Figure 2:
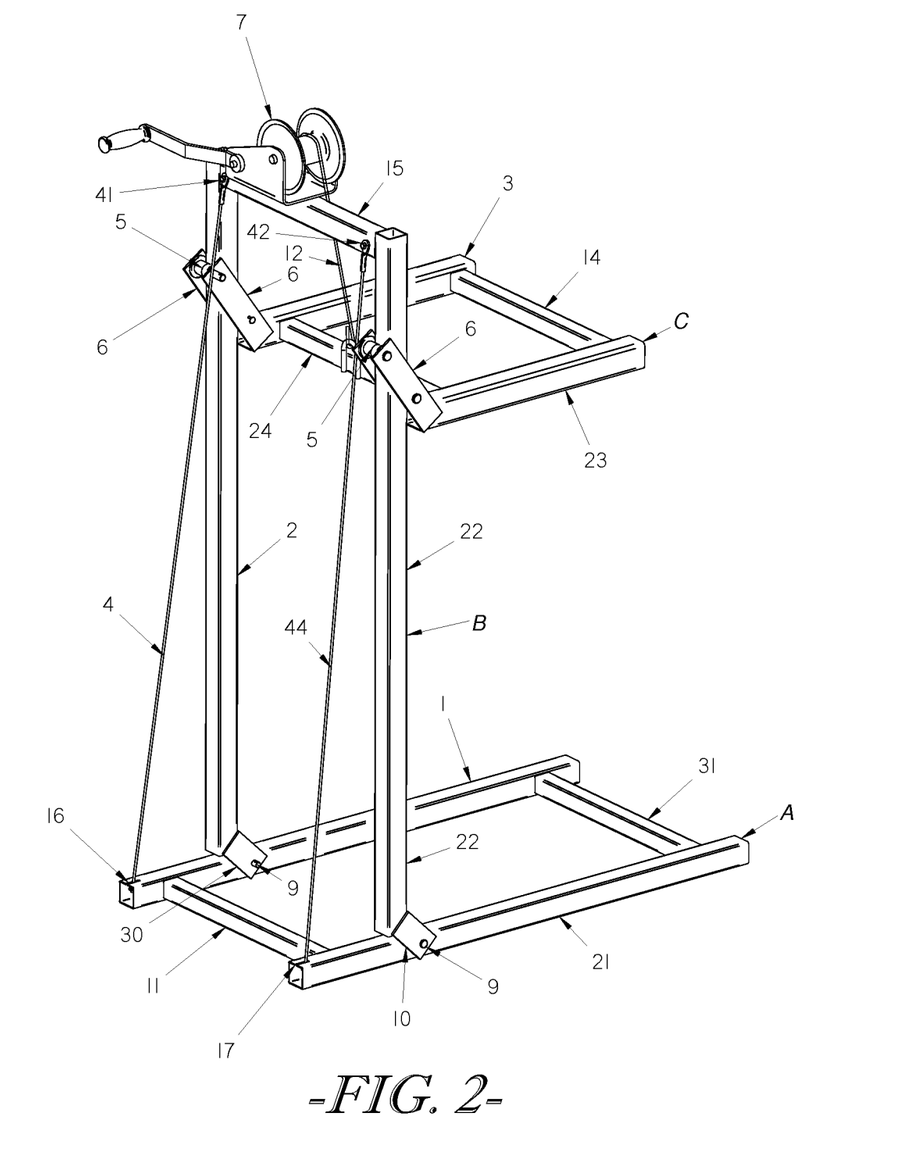
FIG. 2 is a left rear perspective view of the lifting apparatus of FIG. 1.
Figure 3:
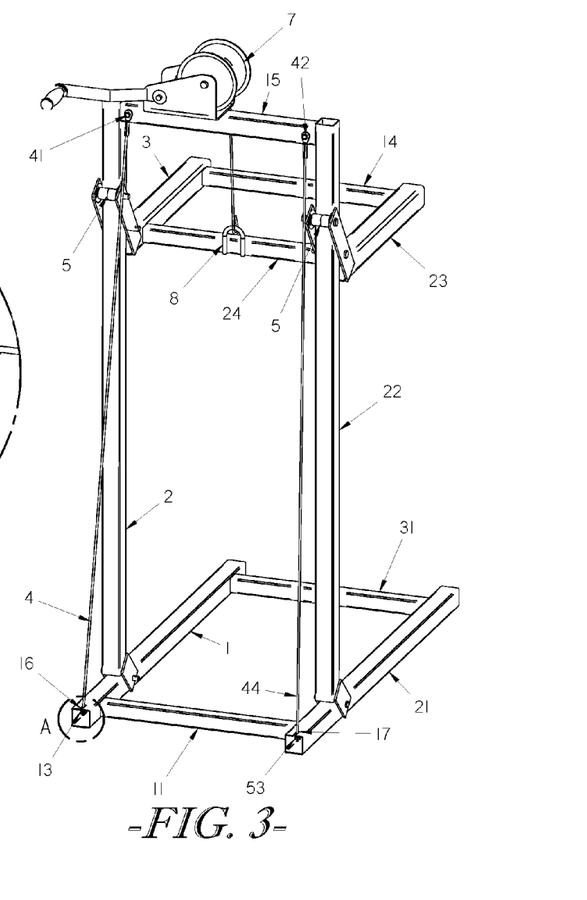
FIG. 3 is another left rear perspective view of the lifting apparatus of FIG. 1.
Figure 4:
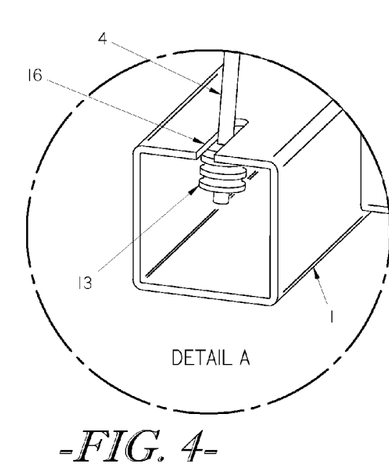
FIG. 4 is a detail view of a support cable secured within a locking slot.
Figure 5:
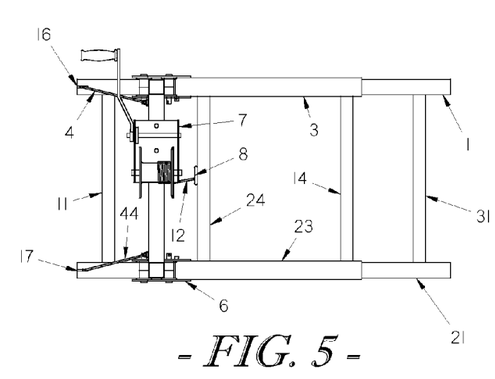
FIG. 5 is a top plan view of the lifting apparatus of FIG. 1.
Figure 6:
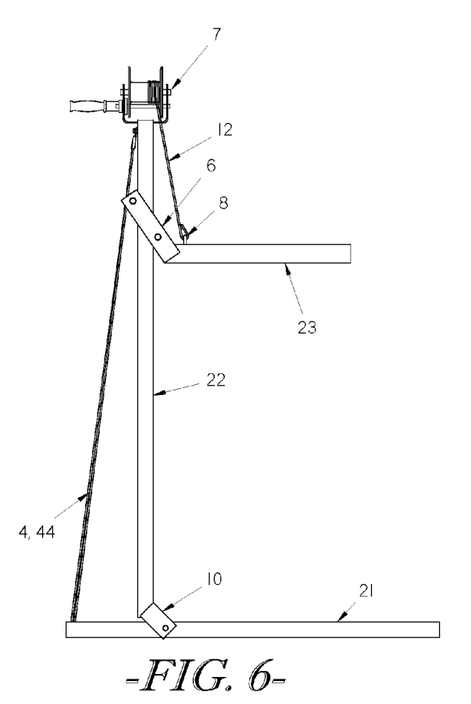
FIG. 6 is a left side elevation view of the lifting apparatus of FIG. 1.
Figure 7:
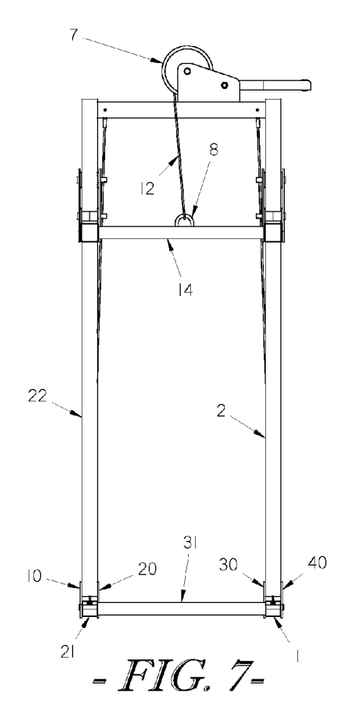
FIG. 7 is a front elevation view of the lifting apparatus of FIG. 1.
Figure 8:
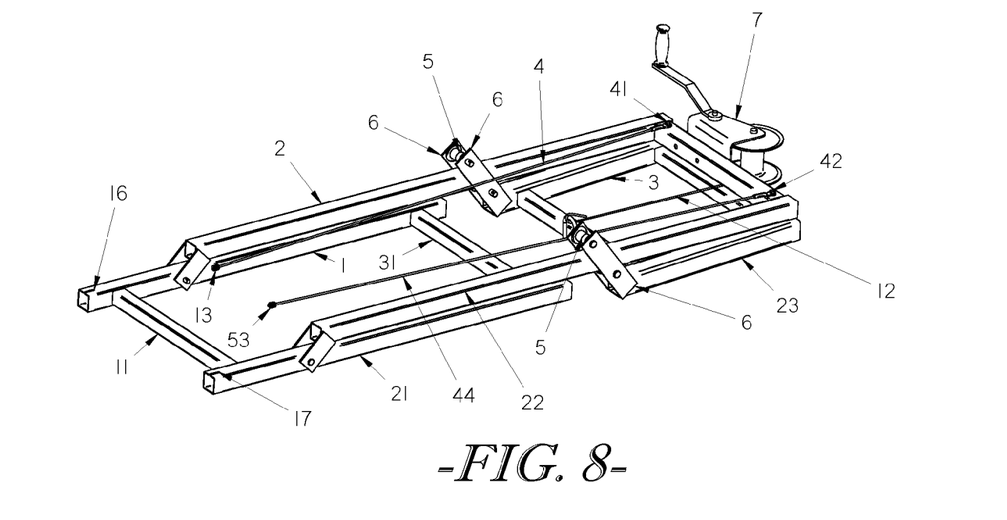
FIG. 8 is a left rear perspective view of the lifting apparatus collapsed for transportation and/or storage.
Figure 9:
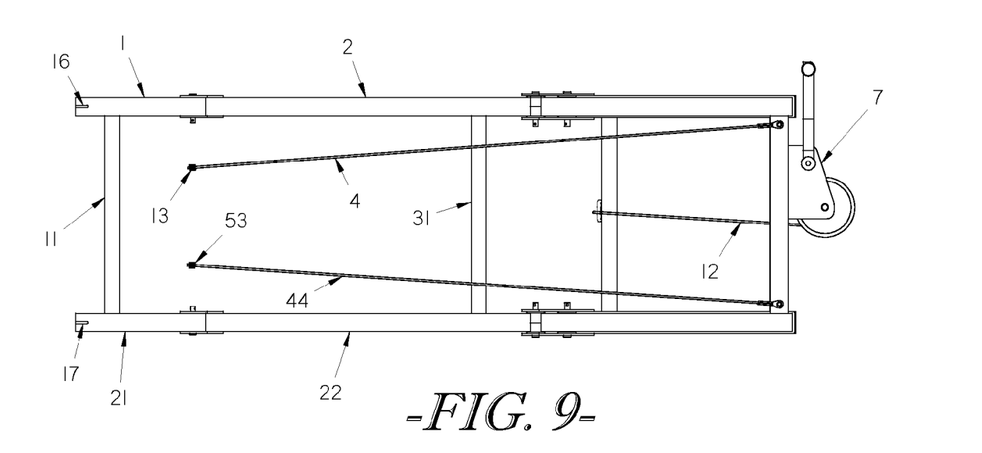
FIG. 9 is a top plan view of the lifting apparatus of FIG. 8.
Figure 10:
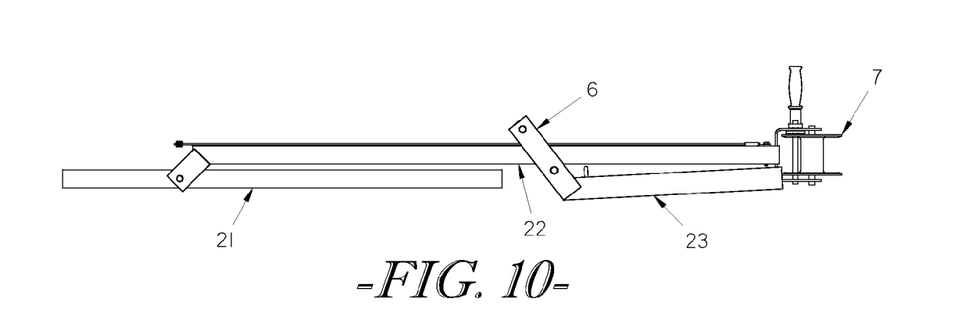
FIG. 10 is a left side elevation view of the lifting apparatus of FIG. 8.

Once the animal has been removed from the lifting frame C, the lifting apparatus can be collapsed for transport and/or storage (see FIGS. 8-10). The cable stop sleeves 13, 53 of the support cables 4, 44 are removed from the locking slots 16, 17 in the first and second base tubes 1, 21. The base frame A can then be pivoted upward 90 degrees into parallel engagement with the support frame B and the lifting frame C can be pivoted upward 90 degrees into parallel engagement with the support frame B. In this substantially flattened configuration, the lifting apparatus can be easily carried and secured to the transport vehicle. The lifting apparatus of the present invention allows a single person to easily and conveniently lift a heavy animal and transfer the animal to a transport vehicle. The lifting apparatus can be quickly assembled for use and dissembled for compact storage by a single person without the use of tools.

While the invention has been shown and described in some detail with reference to a specific exemplary embodiment, there is no intention that the invention be limited to such detail. On the contrary, the invention is intended to include any alternative or equivalent embodiments that fall within the spirit and scope of the invention as described and claimed herein. For example, the reversible locking mechanism formed by the locking slots 16, 17 and the cable stop sleeves 13, 53 for securing the apparatus in an upright position can be replaced with other reversible locking mechanisms known in the art.

The invention claimed is:

1. A portable and collapsible game animal lifting apparatus, comprising:
 a) a horizontal base member having a first base tube having a first end with a slot formed therein, a second base tube having a first end with a slot formed therein, said second base tube parallel to said first base tube, and a third base tube orthogonally affixed to said first base tube and said second base tube to maintain said first base tube in a fixed spaced relationship relative to said second base tube;

b) a vertical support member having a first support tube having a top end and a bottom end, a second support tube having a top end and a bottom end, said second support tube parallel to said first support tube, and a third support tube orthogonally affixed to said top end of said first support tube and said top end of said second support tube to maintain said first support tube in a fixed spaced relationship relative to said second support tube, wherein said bottom end of said first support tube is pivotably attached to said first base tube and said bottom end of said second support tube is pivotably attached to said second base tube;

c) a horizontal lift member having a first lift tube having a first end, a second lift tube having a first end, said second lift tube parallel to said first lift tube, and a third lift tube orthogonally affixed to said first lift tube and said second lift tube to maintain said first lift tube in a fixed spaced relationship relative to said second lift tube, wherein said lift member is pivotably and slidably attached to said support member;

d) a first angled bracket fixedly attached to said first end of said first lift tube and pivotably and slidably attached to said first support tube, said first angled bracket having a pair of spaced rollers for rotatably engaging opposing sides of said first support tube to facilitate said first lift tube with sliding along the length of said first support tube;

e) a second angled bracket fixedly attached to said first end of said second lift tube and pivotably and slidably attached to said second support tube, said second angled bracket having a pair of spaced rollers for rotatably engaging opposing sides of said second support tube to facilitate said second lift tube with sliding along the length of said second support tube;

f) a hand-operable manually-driven winch attached to said third support tube, wherein said winch has a winch cable operably connected to said third lift tube for raising and lowering said lift member;

g) a first support cable having a first end secured to said third support tube and a second end having a cable stop sleeve formed thereon;

h) a second support cable having a first end secured to said third support tube and a second end having a cable stop sleeve formed thereon;

i) wherein said cable stop sleeve of said first support cable is operable to reversibly engage said slot in said first end of said first base tube to secure said support member in an upright position for lifting the game animal, and wherein said cable stop sleeve of said second support cable is operable to reversibly engage said slot in said first end of said second base tube to secure said support member in an upright position for lifting the game animal;

j) wherein said winch is operable to unwind said winch cable from said winch and thereby lower said lift member to receive the game animal thereupon, wherein said winch is further operable to wind said winch cable about said winch and thereby raise said lift member to a desired height to assist in transferring the game animal to a transport vehicle.

2. A portable and collapsible game animal lifting apparatus, comprising:

a) a horizontal base member having a first base tube having a first end with a slot formed therein, a second base tube having a first end with a slot formed therein, said second base tube parallel to said first base tube, and a third base tube orthogonally affixed to said first base tube and said second base tube to maintain said first base tube in a fixed spaced relationship relative to said second base tube;

b) a vertical support member having a first support tube having a top end and a bottom end, a second support tube having a top end and a bottom end, said second support tube parallel to said first support tube, and a third support tube orthogonally affixed to said top end of said first support tube and said top end of said second support tube to maintain said first support tube in a fixed spaced relationship relative to said second support tube, wherein said bottom end of said first support tube is pivotably attached to said first base tube and said bottom end of said second support tube is pivotably attached to said second base tube;

c) a horizontal lift member having a first lift tube having a first end, a second lift tube having a first end, said second lift tube parallel to said first lift tube, and a third lift tube orthogonally affixed to said first lift tube and said second lift tube to maintain said first lift tube in a fixed spaced relationship relative to said second lift tube, wherein said lift member is pivotably and slidably attached to said support member; and d) a winch attached to said third support tube, wherein said winch has a winch cable operably connected to said third lift tube for raising and lowering said lift member;

e) wherein said winch is operable to unwind said winch cable from said winch and thereby lower said lift member to receive the game animal thereupon, wherein said winch is further operable to wind said winch cable about said winch and thereby raise said lift member to a desired height to assist in transferring the game animal to a transport vehicle.

3. A lifting apparatus according to claim 2, further comprising a first angled bracket fixedly attached to said first end of said first lift tube and pivotably and slidably attached to said first support tube, said first angled bracket having a pair of spaced rollers for rotatably engaging opposing sides of said first support tube to facilitate said first lift tube with sliding along the length of said first support tube.

4. A lifting apparatus according to claim 3, further comprising a second angled bracket fixedly attached to said first end of said second lift tube and pivotably and slidably attached to said second support tube, said second angled bracket having a pair of spaced rollers for rotatably engaging opposing sides of said second support tube to facilitate said second lift tube with sliding along the length of said second support tube.

5. A lifting apparatus according to claim 2, further comprising a first support cable having a first end secured to said third support tube and a second end having a cable stop sleeve formed thereon.

6. A lifting apparatus according to claim 5, further comprising a second support cable having a first end secured to said third support tube and a second end having a cable stop sleeve formed thereon.

7. A lifting apparatus according to claim 6, wherein said cable stop sleeve of said first support cable is operable to reversibly engage said slot in said first end of said first base tube to secure said support member in an upright position for lifting the game animal, and wherein said cable stop sleeve of said second support cable is operable to reversibly engage said slot in said first end of said second base tube to secure said support member in an upright position for lifting the game animal.

8. A portable and collapsible game animal lifting apparatus, comprising:
  a) a horizontal base member;
  b) a vertical support member pivotably attached to said base member;
  c) a horizontal lift member pivotably and slidably attached to said support member;
  d) an angled bracket fixedly attached to said lift member and pivotably and slidably attached to said support member, said angled bracket having a pair of spaced rollers for rotatably engaging opposing sides of said support member to facilitate said lift member with sliding along the length of said support member;
  e) a support cable having a first end secured to said support member and a second end having a cable locking mechanism formed thereon; and
  f) a winch attached to an upper portion of said support member, wherein said winch has a winch cable operably connected to said lift member for raising and lowering said lift member;
  g) wherein said cable locking mechanism is operable to reversibly engage said base member to secure said support member in an upright position for lifting the game animal;
  h) wherein said winch is operable to unwind said winch cable from said winch and thereby lower said lift member to receive the game animal thereupon, wherein said winch is further operable to wind said winch cable about said winch and thereby raise said lift member to a desired height to assist in transferring the game animal to a transport vehicle.

\* \* \* \* \*